United States Patent [19]
Donovan et al.

[11] Patent Number: 5,940,589
[45] Date of Patent: Aug. 17, 1999

[54] METHOD AND APPARATUS FOR VALIDATING A SUBSCRIBER TERMINAL ON A TELECOMMUNICATION NETWORK

[75] Inventors: Steven R. Donovan; Shou Gung; Jeremy Chiou, all of Plano, Tex.

[73] Assignee: MCI Corporation, Washington, D.C.

[21] Appl. No.: 08/620,065

[22] Filed: Mar. 21, 1996

[51] Int. Cl.$^6$ ................................................. H04M 11/00
[52] U.S. Cl. ........................... 395/186; 379/58; 455/26.1
[58] Field of Search .............................. 395/186, 187.01; 379/58–63, 111–115; 455/26.1

[56] References Cited

U.S. PATENT DOCUMENTS

| | | | |
|---|---|---|---|
| 5,297,189 | 3/1994 | Chabernaud | 379/58 |
| 5,321,735 | 6/1994 | Breeden et al. | 379/58 |
| 5,325,419 | 6/1994 | Connolly et al. | 379/60 |
| 5,329,573 | 7/1994 | Chang et al. | 379/58 |
| 5,420,908 | 5/1995 | Hodges et al. | 379/58 |
| 5,465,387 | 11/1995 | Mukherjee | 455/26.1 |
| 5,469,497 | 11/1995 | Pierce et al. | 379/115 |
| 5,490,201 | 2/1996 | Moberg et al. | 379/58 |
| 5,592,535 | 1/1997 | Klotz | 379/58 |

*Primary Examiner*—William M. Treat

[57] ABSTRACT

A method and apparatus for validating a terminal for access to a network that includes a central office having a memory for storing an equipment identity record and a local office having a memory for storing a subscriber record and an access count. The equipment identity record and the subscriber record each store an access authorization status of the terminal. Network access for the terminal is requested at the local office and a value of the access count at the local office is incremented when the value of the access count is less than a predetermined number. The access status of the terminal stored in the equipment identity record at the central office is requested by the local office when the terminal requests access for the first time or the value of the access count equals the predetermined number. The access authorization status of the terminal stored in the equipment identity record is sent to the local office in response to the request. The requested access status of the terminal is received at the local office and stored in the subscriber record. The value of the access count is reset in response to receiving the requested access status and access to the network is provided based on the access status stored in the subscriber record.

12 Claims, 4 Drawing Sheets

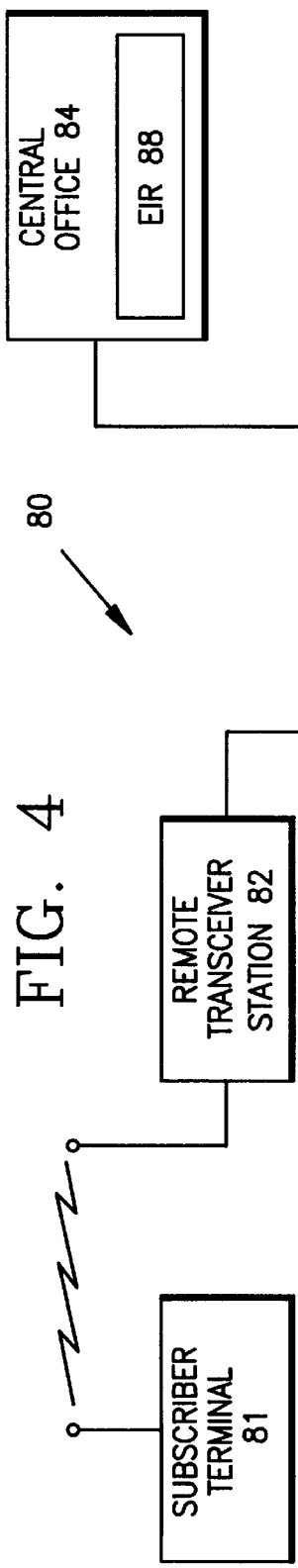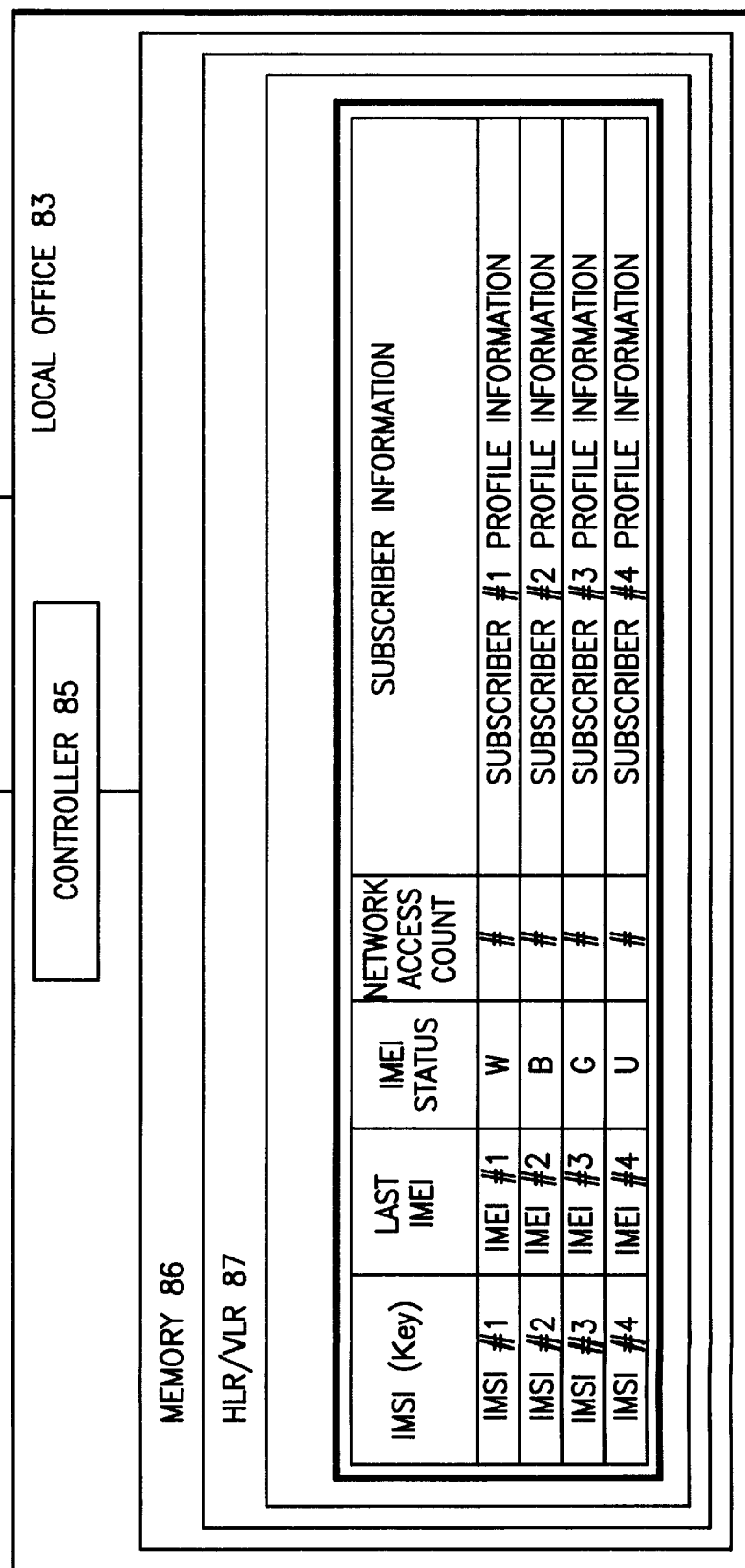
FIG. 4

METHOD AND APPARATUS FOR VALIDATING A SUBSCRIBER TERMINAL ON A TELECOMMUNICATION NETWORK

BACKGROUND OF THE INVENTION

1. Field of the Invention

The present invention relates to a method and an apparatus for providing terminal access security for a telecommunications network. More particularly, the present invention relates to a method and an apparatus for providing terminal access security for a wireless telecommunication network based on the access status of a wireless terminal.

2. Description of the Related Art

Validating a subscriber terminal connection to a telecommunication network is important for detecting fraudulent and/or faulty access to the network. FIG. 1 shows a flow diagram for a prior art system process 10 for validating access for a subscriber terminal to a wireless network. FIG. 2 shows a schematic block diagram of a prior art system 30 that uses process 10 for validating a subscriber terminal for access to a wireless telecommunications network, for example, a GSM network. System 30 includes a subscriber terminal 31, a remote transceiver station 32, a local office 33 and a central office 34. Subscriber terminal 31 can be, for example, a mobile station (MS), remote transceiver station 32 can be, for example, a base transceiver station (BTS), and local office 33 can be, for example, a mobile switching center (MSC).

Subscriber terminal 31 communicates with remote transceiver station 32 in a well-known manner. Remote transceiver station 32 communicates with local office 33 in a well-known manner. While the network of FIG. 2 is shown with only one subscriber terminal, one remote transceiver station and one local office, it should be understood that the network of FIG. 2 includes other subscriber terminals, remote transceiver stations, local offices and system components that are not shown.

Local office 33 includes a controller 35 for controlling voice and network signaling in a well-known manner. A memory device 36 is coupled to controller 35. Memory device 36 can be embodied as hardware that is separate from controller 35 or integrated as part of controller 35. Memory device 36 includes a memory space partition HLR/VLR 37 for storing subscriber data, such as a Home Location Register (HLR) and a Visitor Location Register (VLR). Memory device 36 provides software processing that is separate for HLR/VLR 37 and is different from the processing provided by controller 35. HLR/VLR 37 is a database server that has a record for all subscriber terminals accessing the network through local office 33. HLR/VLR 37 may be integrated into the same memory device 36. Alternatively, HLR and VLR may be remotely located. When remotely located, the HLR and VLR communicate in a well-known manner. FIG. 2 shows that the memory space partition for HLR/VLR 37 associates an International Mobile Subscriber Identity (IMSI) for a subscriber terminal with corresponding subscriber profile information. The IMSI is used as a key to the HLR/VLR database.

Local office 33 is connected to and communicates with central office 34 in a well-known manner. Central office 34 includes an Equipment Identity Register (EIR) 38. The EIR is a database server having a record for all subscriber terminals having access to the wireless network.

At step 11 of FIG. 1, a subscriber accesses the wireless network by, for example, turning on subscriber terminal 31, originating a call or requesting other network-based services. At step 12, the system authenticates the subscriber using well-known techniques. If the subscriber is not authenticated at step 13, the system takes an appropriate action at step 14, such as prohibiting the subscriber from further access to the network.

If the subscriber is authenticated at step 13, the system validates terminal 31 at step 15 by verifying that terminal 31 is a type of terminal approved for the network, that is, equipment approved by an appropriate industry or regulatory agency for accessing the network, or whether the equipment is malfunctioning or stolen. To validate terminal 31, the local office 33 sends a query to central office 34 for obtaining the access status of the terminal. This request is done by the local office 33 sending an IMEI_CHECK message to EIR 38 at central office 34. Each respective subscriber terminal has an associated access status stored in EIR 38 that can be, for example, white, grey, black or unknown. Additional access status levels and other nomenclature can be used for indicating access status of a terminal. The IMEI_CHECK message includes the International Mobile Equipment Identity (IMEI) of subscriber terminal 31 which is used as a key to the database of EIR 38. Central office 34 responds to local office 33 by sending the access status of terminal 31 stored in EIR 38 to the local office in an IMEI_CHECK return result message.

At step 16 of the process, if the access status of terminal 31 is white, terminal 31 is considered to be good and the access to the network requested by the terminal is provided at step 17. A grey access status means that subscriber terminal 31 is considered to be suspect, that is, faulty or stolen. A grey access status at step 18 causes all activity of subscriber terminal 31 to be logged. This logged data may be used by third parties such as for law enforcement purposes at step 19, and the requested network access to be provided at step 20. A subscriber terminal having a black access status at step 21 is considered to be bad because it is, for example, a terminal type that is not approved for access to the network, not functionally compatible with the services provided by the network being accessed, or stolen. All access to the wireless network using a subscriber terminal having a black access status is disallowed at step 22. A terminal having an unknown access status is handled at step 23 using well-known error handling techniques.

The prior art approach to validating terminals for network access is inefficient because network resources are used each time a terminal requests access to the network. While detection of fraudulent and faulty access to the network are insured with the prior art approach, the amount of system signaling associated with this approach is expensive in terms of capacity requirements at the local office, the EIR and the signaling transmission facilities between the two.

Another prior art approach for validating terminals is to perform the validation process periodically such as validating the terminal when the terminal has requested access every predetermined number of times. While this approach reduces the amount of signalling in the system, the opportunity for fraud increases.

SUMMARY OF THE INVENTION

The present invention reduces the signaling requirements between a local office and a central office for validation of a terminal for access to a network by only validating the terminal under predetermined conditions when the terminal is requesting access to the network. Preferably, validation of the terminal occurs when the subscriber is requesting access to the wireless network for the first time or when the subscriber requests access using a subscriber terminal that is different from that used in the previous network access.

The present invention provides a method for validating a terminal for access to a network, wherein the network includes a central office having a memory for storing an equipment identity record and a local office having a memory for storing a subscriber record and an access count. The equipment identity record stores an access status of the terminal and the subscriber record stores a current and a previous access status of the terminal. The value of the access count represents a number of times the terminal has accessed the wireless network at the local office since the terminal was last validated. Preferably, the network is a wireless network and the terminal is a mobile station. The method according to the invention includes the steps of requesting network access by the terminal at the local office, incrementing a value of the access count at the local office when the value of the access count is less than a predetermined number, requesting the access status of the terminal stored in the equipment identity record at the central office when the value of the access count equals the predetermined number, sending the access status of the terminal stored in the equipment identity record to the local office in response to the request, receiving the requested access status of the terminal at the local office, storing the requested access status of the terminal in the subscriber record at the local office as the current access status of the terminal, resetting the value of the access count in response to receiving the requested access status of the terminal, and providing the terminal with the requested access to the network based on the current access status and the previous access status stored in the subscriber record.

Preferably, the step of providing the requested access includes the steps of providing the requested network access when the access status stored in the subscriber record is a first condition, and generating an alarm when the access status stored in the subscriber record is a second condition. Preferably, the first condition is a white access status and the second condition is a grey access status and/or a black access status.

The method of the present invention also provides that the step of generating an alarm further comprises the steps of providing the requested network access when the second condition is the grey access status, and disallowing the requested network access when the second condition is the black access status. When the alarm is generated, the value of the access count is reset and presented to proper personnel at the local office. Additionally, the local office should increment the appropriate grey/black list event counter which may be used for statistical data analysis.

The present invention also provides a system for validating a terminal of a network. The system includes a central office having a memory for storing an access status information of the terminal, and a local office having a memory for storing a current access status information of the terminal, a previous access statu information and an access count value representing a number of times the terminal has accessed the network at the local office since the terminal was last validated. When the terminal requests access to the network at the local office, the local office increments the access count value when the access count value is less than a predetermined number. The local office then requests the access status information stored at the central office when the access count equals the predetermined number by sending the international mobile equipment identification information associated with the terminal to the central office. The central office responds to the request of the local office by sending the access status information for the terminal to the local office. The local office stores the requested access status information for the terminal in the memory of the local office and resets the value of the access count. The terminal is provided with the requested access to the network based on the current and the previous access status information stored in the subscriber record.

BRIEF DESCRIPTION OF THE DRAWINGS

The present invention is illustrated by way of example and not limitation in the accompanying figures in which like reference numerals indicate similar elements and in which:

FIG. 4 shows a schematic block diagram of a system for validating a subscriber terminal according to the present invention.

DETAILED DESCRIPTION OF THE PREFERRED EMBODIMENT

Figure 1:
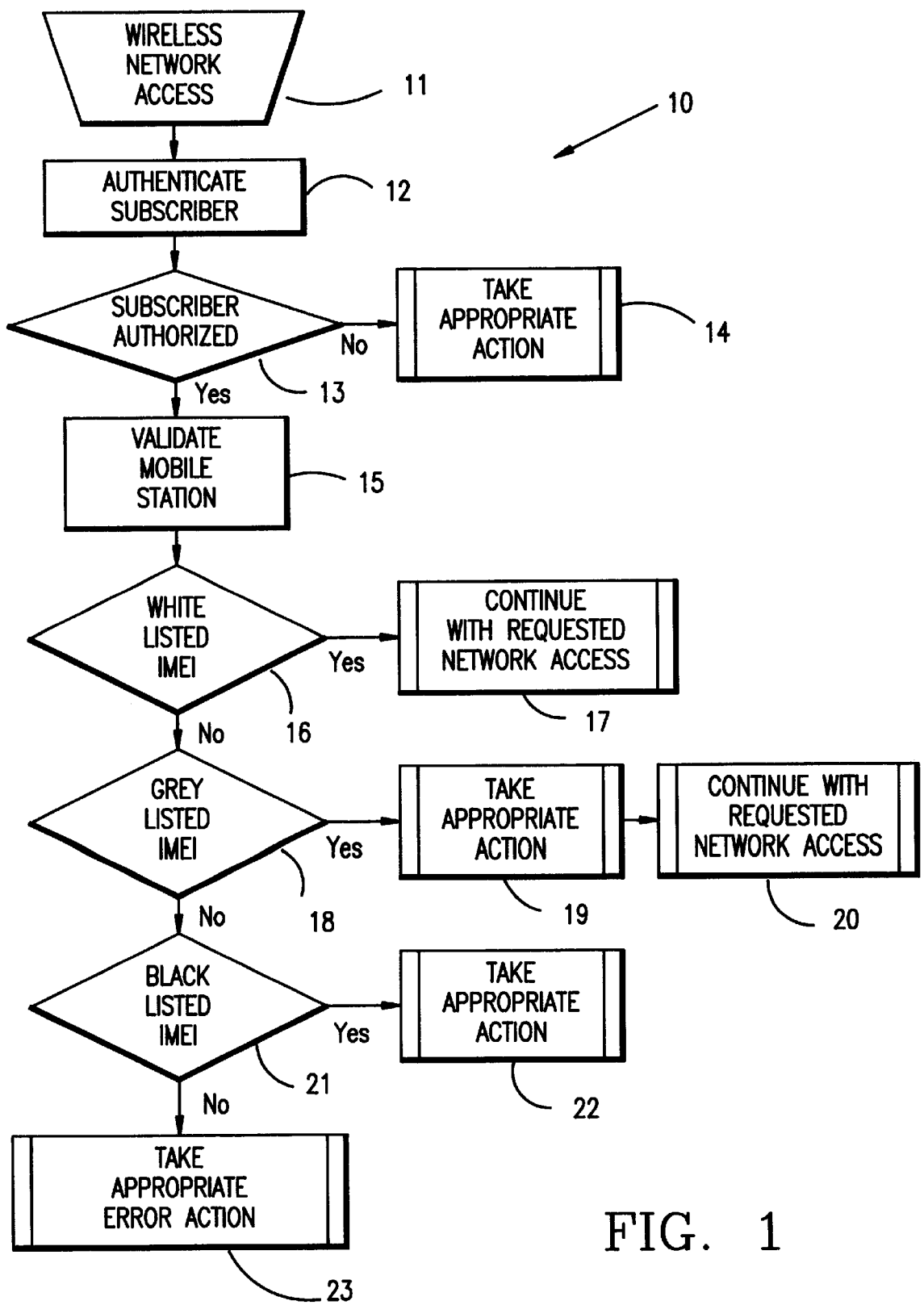
FIG. 1 shows a prior art flow diagram for a process for validating a subscriber terminal.
Figure 2:
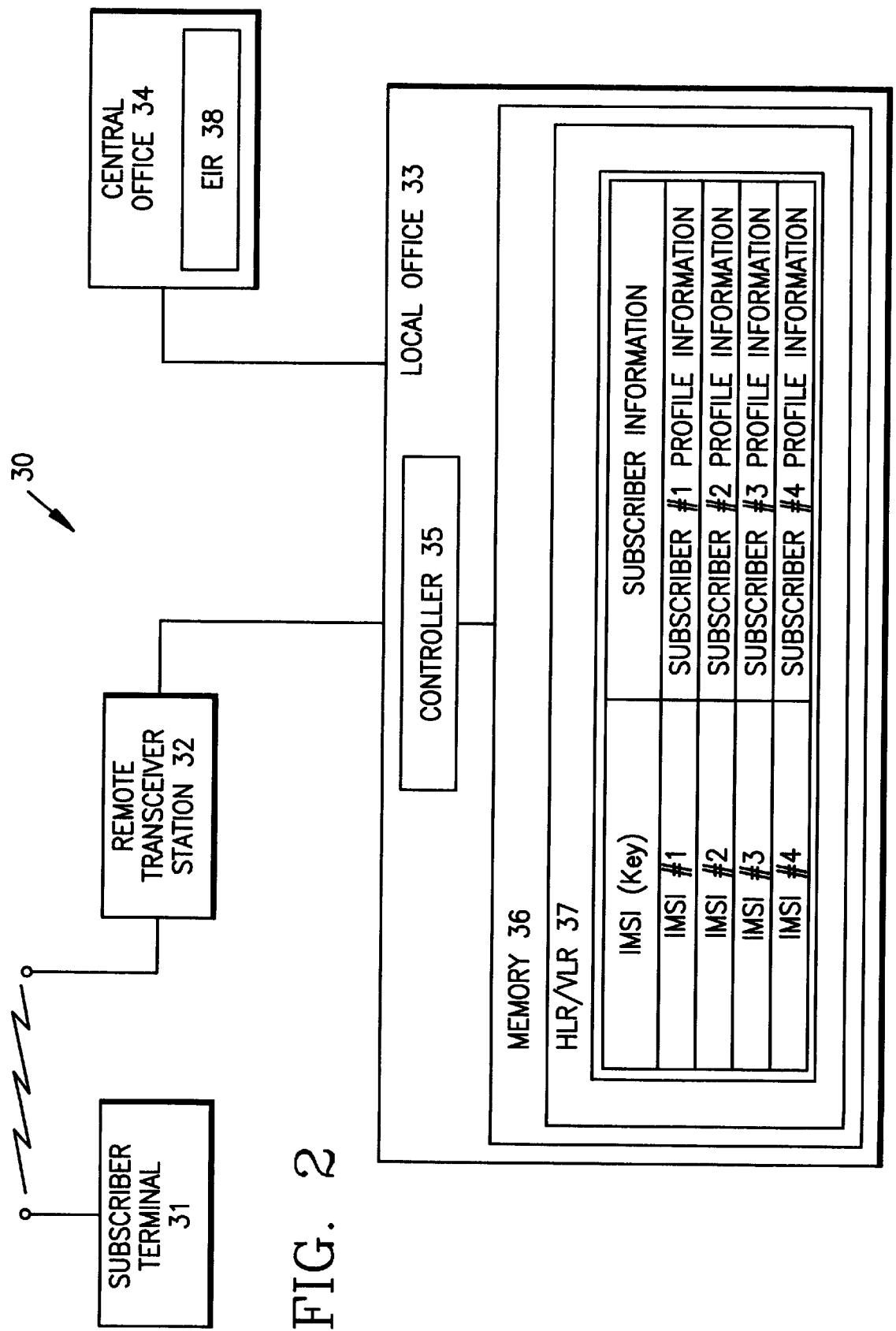
FIG. 2 shows a prior art schematic block diagram of a system for validating a subscriber terminal.
Figure 3:
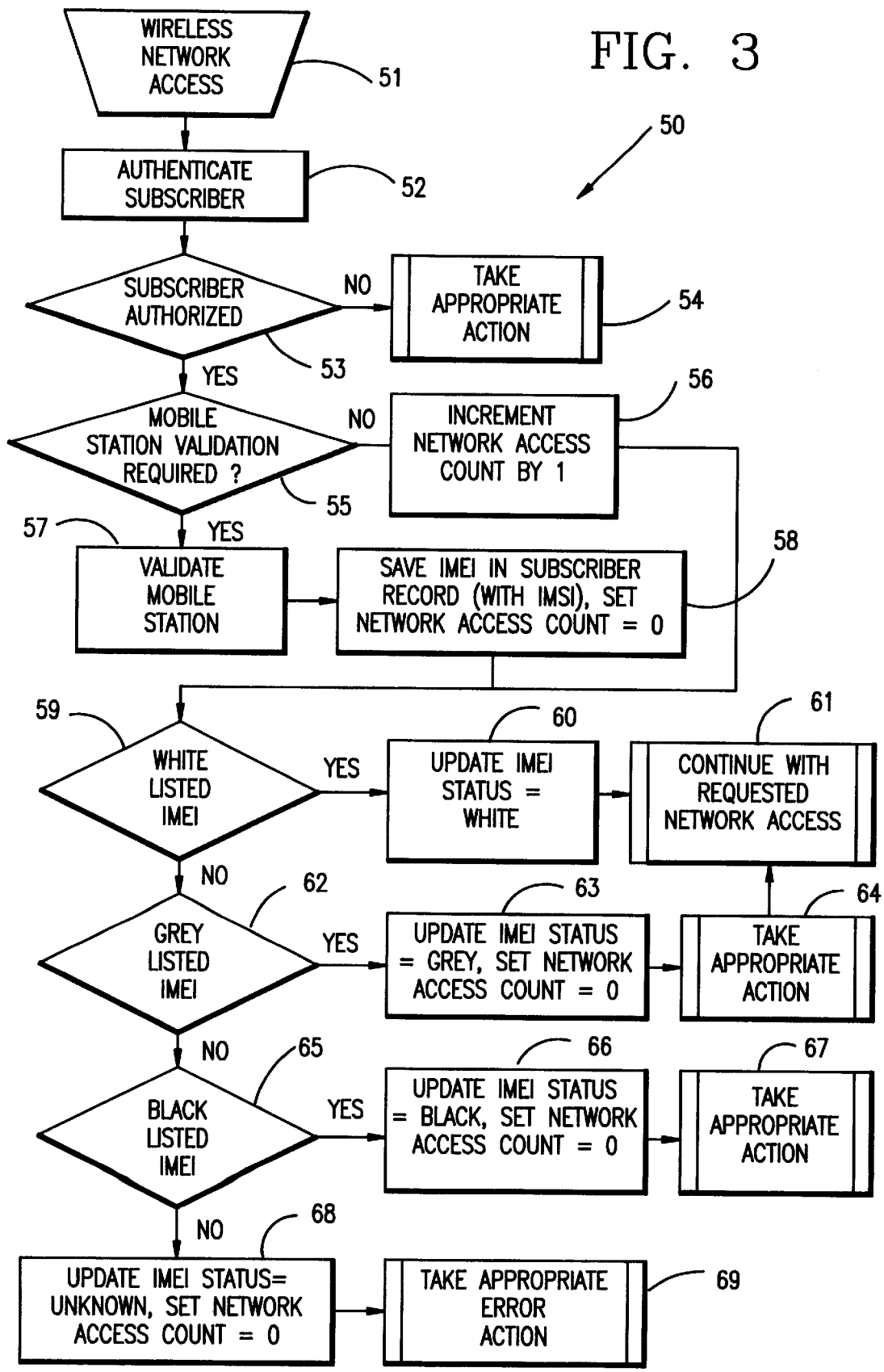
FIG. 3 shows a flow diagram for a process for validating a subscriber terminal according to the present invention.

The present invention optimizes an access security operation for a wireless telecommunications network, such as a GSM-based wireless network. FIG. 3 shows a flow diagram for a process 50 for validating a subscriber terminal according to the present invention. FIG. 4 shows a schematic block diagram of a system 80 that uses process 50 for validating a subscriber terminal for access to a wireless telecommunications network. System 80 includes a subscriber terminal 81, a remote transceiver station 82, a local office 83 and a central office 84.

Terminal 81, such as a mobile station, communicates with remote transceiver station 82, such as a base station transceiver, in a well-known manner. Similarly, remote transceiver station 82 communicates with local office 83, such as a mobile switching center, in a well-known manner. Even though the network of FIG. 4 is shown with only one subscriber terminal, one remote transceiver station and one local office, the network of FIG. 4 includes other subscriber terminal, remote transceiver stations, local offices and system components that are not shown. Further, the concepts of the present invention are applicable to any telephony network implementing network-based checking of a terminal access status, even though the network of FIG. 4 is described in terms of a GSM-based wireless network.

Local office 83 includes a controller 85 for controlling voice and network signaling in a well-known manner. A memory device 86 is coupled to a controller 85. Memory device 86 can be embodied as hardware that is separate from controller 85 or integrated as part of controller 85. Memory device 86 includes a memory space partition HLR/VLR 87 for storing subscriber data. HLR/VLR 87 is a database server that has a record for all subscriber terminals accessing the network through local office 83. HLR/VLR 87 may be integrated into the same memory device 86. Alternatively, HLR and VLR may be remotely located to one another. When remotely located, HLR and VLR communicate in a well-known manner. Memory device 86 provides software processing that is separate for HLR/VLR 87 and is different from the processing provided by controller 85. FIG. 4 shows that the memory space partition for HLR/VLR 87 associates an IMSI of a terminal with the last IMEI used by a subscriber associated with the terminal, a current IMEI status, a network access count value and the corresponding subscriber profile information. The four exemplary terminal statuses, white, grey, black and unknown, are indicated in FIG. 4 as W, G, B and U, respectively. At any instance in time, any of the IMSI records held by HLR/VLR 87 may hold any of the statuses W, G, B, or U.

Local office 83 is connected to and communicates with central office 84 in a well-known manner. Central office 84 includes an EIR 88 that is a database server having a record for all subscriber terminals having access to the wireless network.

At step 51 of the validation process 50 of the present invention shown in FIG. 3, the subscriber accesses the network by, for example, turning on subscriber terminal 81, originating a call or by requesting other network-based services. At step 52, the network authenticates the subscriber using well-known techniques. If the subscriber is not properly authenticated at step 53, then the system takes an appropriate action at step 54, for example, denying the subscriber access to the network. At step 55, the HLR/VLR at local office 83 determines whether mobile terminal 81 requires validation for any one of several reasons. For example, the IMEI of the subscriber terminal used by the subscriber for this particular network access is different than the IMEI of the terminal used by the subscriber during the previous network access. That is, the subscriber is using a different terminal than during the previous access. Another example of a reason for validation of the terminal is that a predetermined number n of network accesses have occurred since the last validation for an unchanged IMEI. The predetermined number n can vary from the service provider to service provider. Other reasons can also cause the system to validate a terminal.

If a subscriber terminal validation is not required at step 55, validation by an IMEI_CHECK message sent from local office 83 to EIR 88 at central office 84 is not performed. Instead, a simple database lookup validation at local office 83 is done. The subscriber is allowed network access if the IMEI_STATUS is found to be white. Local office 83 will take an appropriate action if the associated IMEI_STATUS is found to be other than white. The value of the network access count for this particular subscriber is then incremented at step 56. If the subscriber terminal requires validation, then at step 57 an IMEI_CHECK message is sent from local office 83 to the EIR 88 at central office 84. EIR 88 determines the access status of the subscriber terminal and returns the access status in an IMEI_CHECK return result message. The returned IMEI access status is saved in the HLR/VLR 87 at local office 83 and the network access count is reset at step 58. In the example shown in FIG. 3, the resetting of the access count sets the access count to zero. Other well-known techniques for resetting the access count value can be used such as setting the value to a predetermined number in which case the access count would be decremented to zero.

If the access status of the subscriber terminal in the EIR 88 is white at step 59, then the IMEI access status in the subscriber record in HLR/VLR 87 at local office 83 is updated at step 60. The network access requested by the terminal is then granted and the network service logic is executed at step 61. The previous IMEI and its associated access status is retained in HLR/VLR 87 for optimizing the validation operation signaling by allowing determination of subscriber identity with terminal identification for tracking history of a subscriber's use of invalid terminals.

If the subscriber terminal access status in EIR 88 is grey at step 62, then at step 63 the IMEI access status in HLR/VLR 87 is updated to grey. The appropriate action is taken at local office 83 at step 64, such as performing a measurement or signaling an alarm. Access to the network is generally granted at this point (step 61), however, this is a service provider specific option.

If at step 65 the subscriber terminal access status in EIR 88 is black, then the IMEI access status is updated to black in the subscriber record of HLR/VLR 87 at step 66. The appropriate action is taken at local office 83, such as performing a measurement or signalling an alarm, and the requested access to the network is disallowed at step 67.

If the subscriber terminal was not on a list at EIR 88, the IMEI access status is set to unknown in the subscriber record of HLR/VLR 87 and the network access count is reset at step 68. The appropriate action is taken at step 69 which is typically service provider specific for allowing access to the network. Additionally, it will be a service provider option to allow certain categories of calls at steps 62, 65 and 68. Such instances may include, but not be limited to emergency service calls.

While the present invention has been described in connection with the illustrated embodiment, it will be appreciated and understood that modifications may be made without departing from the true spirit and scope of the invention.

What is claimed is:

1. A method for validating a terminal for access to a network, the network including a central office having a memory for storing an equipment identity record and a local office having a memory for storing a subscriber record and an access count, the equipment identity record storing an access status of the terminal and the subscriber record storing a current and a previous access status of the terminal, the method comprising the steps of:

requesting network access for the terminal at the local office;

incrementing a value of the access count at the local office when the value of the access count is less than a predetermined number, the value of the access count representing a number of times the terminal has accessed the network at the local office since the terminal was last validated;

requesting the access status of the terminal stored in the equipment identity record at the central office when the value of the access count equals the predetermined number;

sending the access status of the terminal stored in the equipment identity record to the local office in response to the request;

receiving the requested access status of the terminal at the local office;

storing the requested access status of the terminal in the subscriber record at the local office as the current access status of the terminal;

resetting the value of the access count in response to receiving the requested access status of the terminal; and providing the terminal with the requested access to the network based on the current access status and the previous access status of the terminal stored in the subscriber record.

2. The method according to claim 1, wherein the network is a wireless network.

3. The method according to claim 2, wherein the step of providing the requested access comprises the steps of:

providing the requested network access when the access status stored in the subscriber record is a first condition; and generating an alarm when the access status stored in the subscriber record is a second condition.

4. The method according to claim 3, wherein the first condition is a white access status and the second condition is a grey access status and/or a black access status.

5. The method according to claim 4, wherein the step of generating an alarm comprises the steps of:

providing the requested network access when the second condition is the grey access status; and disallowing the requested network access when the second condition is the black access status.

6. The method according to claim 5, wherein the step of generating an alarm further comprises the step of resetting the value of the access count.

7. A system for validating a terminal for access to a network, the system comprising:

a central office having a memory for storing an access status information of the terminal; and a local office having a memory for storing a current access status information of the terminal, a previous access status information of the terminal and an access count value, the access count value representing a number of times the terminal has accessed the network at the local office since the terminal was last validated, when the terminal requests access to the network at the local office, the local office increments the access count value when the access count value is less than a predetermined number, and requests the access status information stored at the central office when the access count equals the predetermined number, the central office responds to the request of the local office by sending the access status information for the terminal to the local office and the local office stores the requested access status information for the terminal in the memory of the local office and resets the value of the access count, the local office provides the terminal with the requested access to the network based on the current and the previous access status information stored in the subscriber record.

8. The system according to claim 7, wherein the network is a wireless network.

9. The system according to claim 8, wherein the access status information includes a first condition and a second condition, when the access status information stored in the subscriber record is a first condition, the local office provides the terminal with the requested network access, and when the access status information stored in the subscriber record is a second condition, the local office generates an alarm.

10. The system according to claim 9, wherein the first condition is a white access status and the second condition is a grey access status and/or a black access status.

11. The system according to claim 10, wherein when the access status information is a grey access status, the local office further provides the terminal with the requested network access when the second condition is the grey access status; and when the access status information is a black access status, the local office disallows the terminal from the requested network access.

12. The system according to claim 11, wherein when the local office generates the alarm, the value of the access count is reset.

* * * * *